(12) United States Patent
Marrón et al.

(10) Patent No.: US 6,901,410 B2
(45) Date of Patent: May 31, 2005

(54) LDAP-BASED DISTRIBUTED CACHE TECHNOLOGY FOR XML

(76) Inventors: Pedro José Marrón, Obergasse 13, 79111 Freiburg (DE); Georg Lausen, Karlstrasse 77, 79104 Freiburg (DE)

(*) Notice: Subject to any disclaimer, the term of this patent is extended or adjusted under 35 U.S.C. 154(b) by 483 days.

(21) Appl. No.: 09/990,592

(22) Filed: Nov. 23, 2001

(65) Prior Publication Data

US 2003/0065874 A1 Apr. 3, 2003

Related U.S. Application Data

(60) Provisional application No. 60/317,946, filed on Sep. 10, 2001.

(51) Int. Cl.[7] .............................................. G06F 17/30
(52) U.S. Cl. ................................................. 707/104.1
(58) Field of Search .......................... 707/3, 10, 100, 707/102, 104.1, 2, 101; 717/146

(56) References Cited

U.S. PATENT DOCUMENTS

| | | | | |
|---|---|---|---|---|
| 5,999,938 A | * | 12/1999 | Bliss et al. ................ | 707/102 |
| 6,092,067 A | * | 7/2000 | Girling et al. .............. | 707/100 |
| 6,470,351 B1 | * | 10/2002 | Ahmadi ...................... | 707/102 |
| 6,477,525 B1 | * | 11/2002 | Bello et al. .................... | 707/3 |
| 6,636,854 B2 | * | 10/2003 | Dutta et al. .................. | 707/10 |
| 2002/0059566 A1 | * | 5/2002 | Delcambre et al. ......... | 717/146 |
| 2002/0143819 A1 | * | 10/2002 | Han et al. ................... | 707/513 |

OTHER PUBLICATIONS

Open LDAP 2.0, Sep. 15, 2000.*
Microsoft XML 3.0 Xpath, 1999.*

* cited by examiner

*Primary Examiner*—Safet Metjahic
*Assistant Examiner*—Sana Al-Hashemi
(74) *Attorney, Agent, or Firm*—Paul Vincent

(57) ABSTRACT

The design, internal data representation and query model of the invention, a hierarchical distributed caching system for semi-structured documents based on LDAP technology is presented that brings both, the semi-structured data model and the LDAP data model together into a system that provides the ideal characteristics for the efficient processing of XPath queries over XML documents. Transformation algorithms and experimental results have also been shown that prove the feasibility of the invention as a distributed caching system especially tailored for semi-structured data.

20 Claims, 13 Drawing Sheets

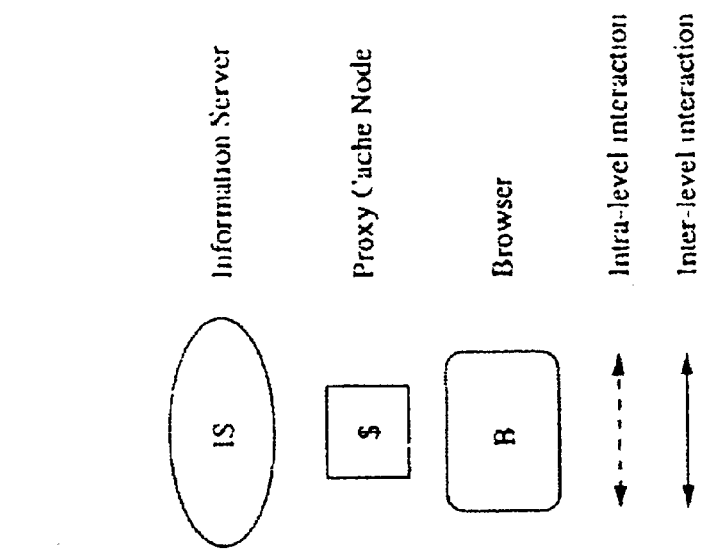
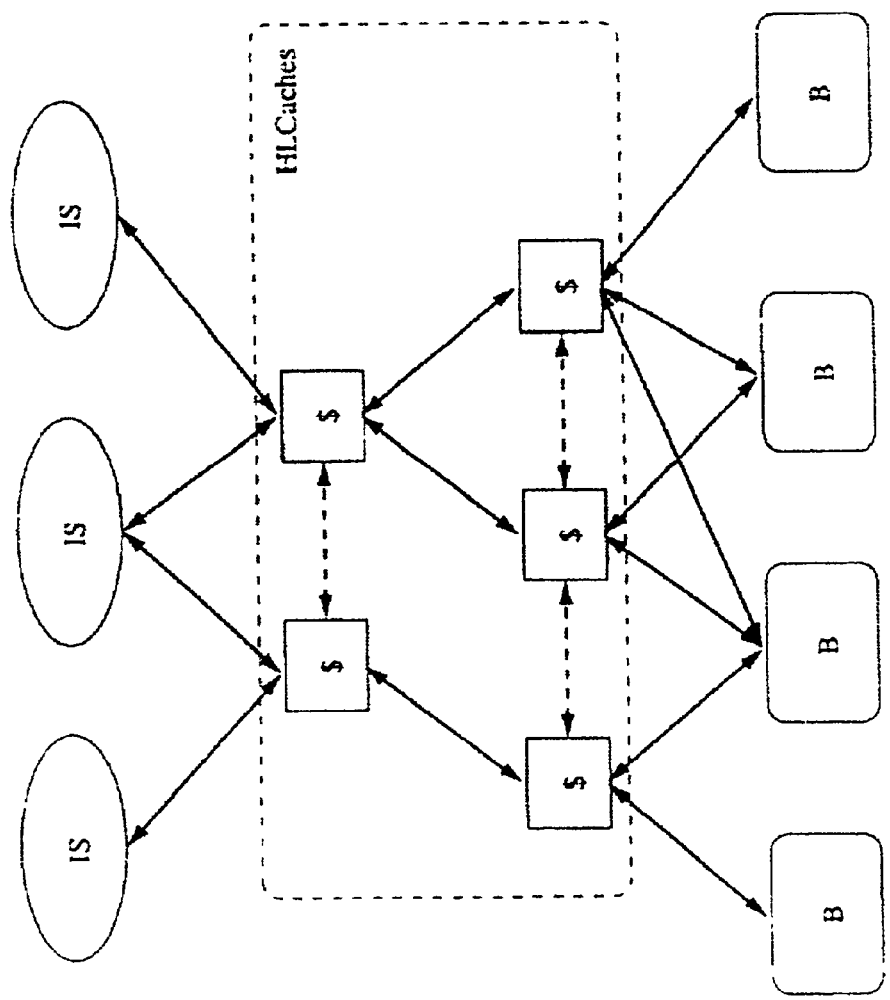
Fig. 1

```
XMLNode OBJECT-CLASS ::={
    SUBCLASS OF {top}
    MUST CONTAIN {oc,oid,name}        // required attributes
    TYPE oc OBJECT-CLASS
    TYPE oid DN                        // dns formed by oids
    TYPE name STRING
}
XMLElement OBJECT-CLASS ::= {
    SUBCLASS OF {XMLNode}
    MUST CONTAIN {order}               // required attributes
    MAY CONTAIN {value}                // allowed attributes
    TYPE order INTEGER
    TYPE value STRING
}
XMLAttribute OBJECT-CLASS ::={
    SUBCLASS OF {XMLNode}
    MUST CONTAIN {value}               // required attributes
    TYPE value DN, STRING
}
```

*Fig. 3*

```
Algorithm XML2LDAP ( D )

Let  D  be an XML document to processed from left to right
/* Initialize the current node to the top of the LDAP cache
tree */
CurrentNode = "(cn=Cache,dc=top)"

while there is input  i  from  D
/* If an opening tag is found in the inventive input  i  */
     if  i  is
        <tagName attrName₀=attrValue₀...attrNameₙ=attrValueₙ>
             NewNode = XMLElement(tagName)
             link(CurrentNode, NewNode)
             CurrentNode = NewNode
             /* Create the attributes and link them to the
new node */
             for each attrName, attrValue pairs
                  NewAttribute = XMLAttribute(attrName,
attrValue)
                  link(NewNode, NewAttribute)

/* If a closing tag is found in the inventive
input  i  */
        if  i  is  </tagName>
             CurrentNode = Parent(CurrentNode)

/* else,  i  is the content of the node */
        else
             CurrentNode.value =  i
```

*Fig. 4*

```
<country car_code="D", area="356910",
         capital="Berlin">
  <name>Germany</name>
  <population>83536115</population>
  <languages percentage="100">
    German</languages>
  <province id="B-W", capital="cid-9",
            country="D">
    ...
  </province>
</country>
```

*Fig. 5*

```xml
<country car_code="D" area="356910" capital="Berlin">
  <name>Germany</name>
  <population>83536115</population>
  <languages percentage="100">German</languages>
  <province id="B-W" capital="cid-9" country="D">
    <name>Baden Wurttemberg</name>
    <area>35742</area>
    <population>10272069</population>
    <city id="cid-9" is_state_cap="yes" country="D"
          province="B-W">
      <name>Stuttgart</name>
      <longitude>9.1</longitude>
      <latitude>48.7</latitude>
      <population year="95">588482</population>
    </city>
  </province>
</country>
```

Figure 7:
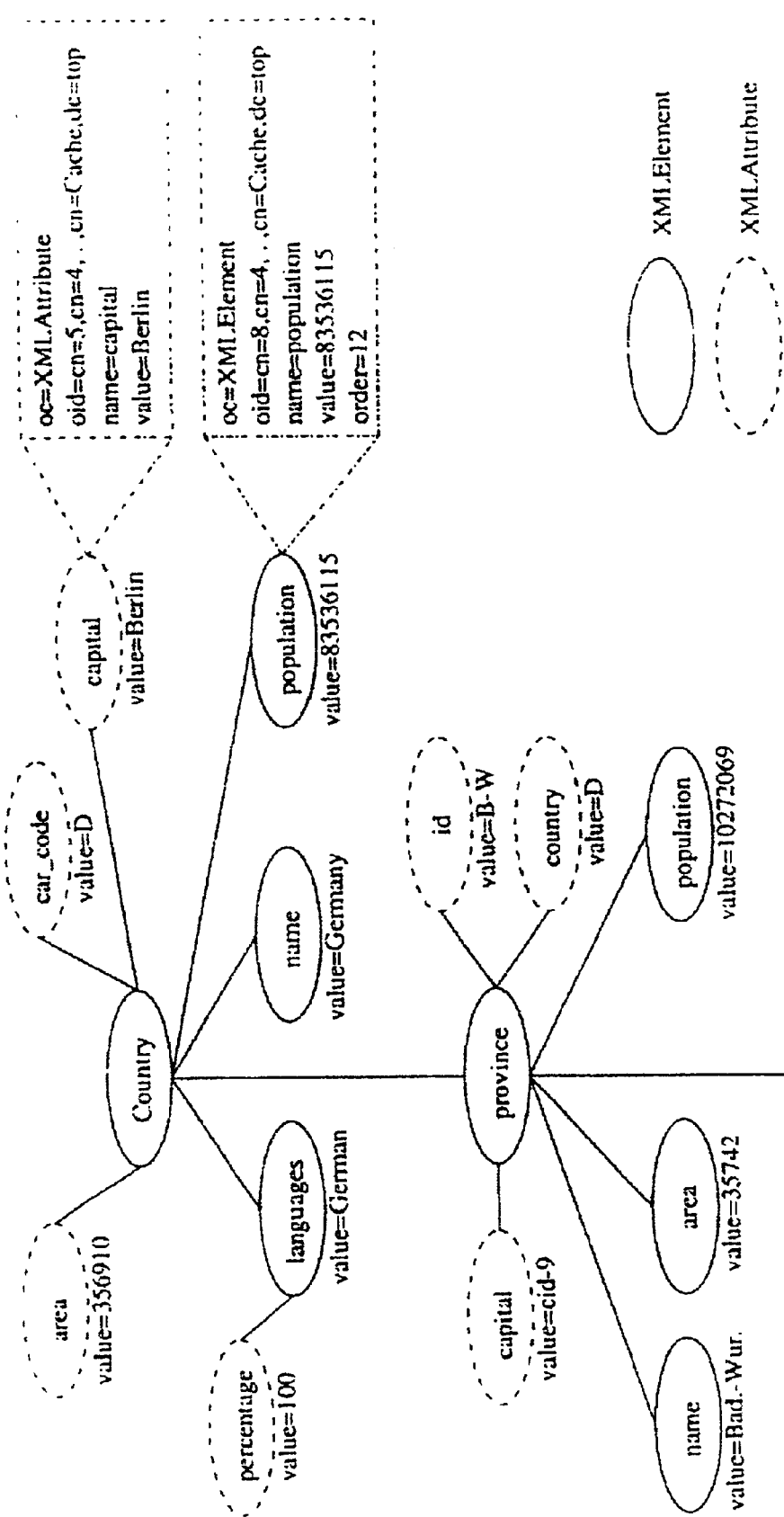

*Fig. 7*

Fig. 8 (part one)

Fig. 8 (part two)

```
XMLQuery OBJECT-CLASS ::=
   SUBCLASS OF top
   MUST CONTAIN oc,hash,context,scope,xpathquery,result,
                create\_time,access\_time,popularity
   TYPE oc OBJECT-CLASS
   TYPE hash STRING
   TYPE context DN
   TYPE scope STRING
   TYPE xpathquery STRING
   TYPE result DN
   TYPE create_time STRING
   TYPE access_time STRING
   TYPE popularity INTEGER
```

*Fig. 9*

```
Algorithm XPath2LDAPQL ( Q_X )

Let  Q_X  be an XPath query

/* Initialize  C_0  to the cache root */

C_0 = "cn=Cache,dc=top"

For each subquery  q_i = (C_i, w_i, C_{i+1}) ∈ Q_X

/* Create a new XMLQuery node and initialize its
attributes */

NewXMLQuery.context =  C_i

NewXMLQuery.xpathquery =  w_i

NewXMLQuery.hash = hash( w_i )

/* For each node in the context, evaluate  w_i  on
it */ for each  n ∈ C_i

C_{i+1} = C_{i+1} ∈  EVAL(PET( n,w_i ))

NewXMLQuery.result =  C_{i+1}
```

*Fig. 11*

```
Algorithm EVAL (Q, S)

/* Q is an LDAPQL query (called main query) */
    /* S = {S_i} is a set of LDAPQL queries (subordinate)
*/
    Result = LDAP( Q )
    for each subquery S_i ∈ S
        Result = Result ∩ LDAP( S_i )
    Return Result Algorithm PET( n , w_i )

/* n is a distinguished name and w_i = a_i::e_i[c_i] */
    Let Q_HL be an LDAPQL query (called main query)
    Let S = {S_j} be a set of LDAPQL queries (subordinate)

/* Translate a_i into Q_HL = (b_QHL, s_QHL, f_QHL, p_QHL) */
    (b_QHL, s_QHL, f_QHL) = BaseScope( n , a_i )
    for each nodeName ∈ e_i
        f_QHL = f_QHL ∩ (name = nodeName)
    p_QHL = {}

/* Translate each predicate cp_j into S_j =
(b_Sj, s_Sj, f_Sj, p_Sj) */
    Let S = {}
    for each cp_j ∈ c_i
        Let cp_j be of the form term_j op_j value_j
        (b_Sj, s_Sj, f_Sj) = BaseScope(LDAP( Q_HL ), term_j )
        for each (nodeName, nodeValue) ∈ c_i
            f_Sj = f_Sj ∩ (&(name = nodeName)(value =
nodeValue))
        p_Sj = {}
        S = S ∪ S_j Return ( Q_HL , S )
```

*Fig. 12*

LDAP-BASED DISTRIBUTED CACHE TECHNOLOGY FOR XML

This application claims benefit of provisional application No. 60/317,946 filed on Sep. 10, 2001 the entire disclosure of which is hereby incorporated by reference.

BACKGROUND OF THE INVENTION

The invention concerns a method for incorporating and accessing semi-structured data within an LDAP environment.

With the release of the Lightweight Directory Access Protocol (LDAP) version 3 in 1997 [M. Wahl, T. Howes, and S. Kille. Lightweight directory access protocol (v3). RFC 2251, December 1997. ], the popularity of directories to store information about users, networks, etc. has been steadily increasing. Even companies like Netscape or Microsoft offer LDAP support in their browsers and operating systems, making directory services a viable alternative to more traditional database systems for the storage and efficient retrieval of information. At the same time, the Internet community has been moving away from static HTML to describe information on the web, towards more dynamic and easily configurable options that allow the decoupling of content, usually represented in form of XML data [Tim Bray, Jean Paoli, C. M. Sperberg-McQueen, and Eve Maler. Extensible markup language (XML) 1.0 (second edition). www.w3.org/TR/2000/REC-XML-20001006, October 2000.], and format, usually represented as CSS data [Hakon Wium Lie and Bert Bos. Cascading style sheets, level 1. www.w3.org/TR/REC-CSS1, January 1999.]. This transition has lead to an increase in the involvement of the database community in issues related to semi-structured databases [H. V. Jagadish, Laks V. S. Lakshmanan, Tova Milo, Divesh Srivastava, and Dimitra Vista. Querying network directories. In SIGMOD 1999, Proceedings ACM SIGMOD International Conference on Management of Data, Jun. 1–3, 1999, Philadephia, Pa., USA, pages 133–144. ACM Press, 1999], a reevaluation of semi-structured data models, and even to the creation of models and mechanisms to efficiently represent and process semi-structured data in relational database systems [Albrecht Schmidt, Martin L. Kersten, Menzo Windhouwer, and Florian Waas. Efficient relational storage and retrieval of XML documents. In Proceedings of the Third International Workshop on the Web and Databases, pages 47–52, Dallas. Tex., May 2000. Khaied Yagoub, Danlela Florescu, Valerie Issamy, and Patrick Valdurlez. Caching strategies for data-intensive web sites. In Proceedings of the 26th VLDB Conference, Cairo, Egypt, 2000]. These relational systems have, nevertheless, limitations due to differences in the representation and query model [Jayavel Shanmugasundaram, Kristin Tufte, Gang He, Chun Zhang, David DeWitt, and Jeffrey Naughton. Relational databases for querying XML documents: Limitations and opportunities. In Proceedings of the 25th VLDB Conference, Edinburgh, Scotland, 1999.] that support the need for XML processing systems closer to its semi-structured nature.

In view of this prior art, it is the underlying purpose of the present invention to present an architectural design, query model and experimental results for a hierarchical distributed caching system based on LDAP technology developed to:

Improve the performance of data retrieval of sites based on XML technology;

Improve the current state of caching technology on the Internet by providing a system that supports both older and newer technologies; and Serve as an example of a real world application on top of Plexor, a generic middleware framework for distributed applications.

SUMMARY OF THE INVENTION

This purpose is achieved in accordance with the invention with a method comprising the steps of transforming the semi-structured data into LDAP data; converting a query, written in a semi-structured query language for operation on said semi-structured data, into an LDAP query; and accessing said LDAP data with said LDAP query.

In accordance with the invention a combination of an internal data representation, described in detail below, with the query, written in a semi-structured query language, offers, despite its simplicity, substantial advantages that make the invention suitable for deployment in a distributed caching environment.

The invention facilitates an XML processing system whose internal data representation and query model provide efficient evaluation of XPath queries using LDAP. Besides providing support for network operations and query distribution over a set of nodes, the LDAP model is sufficiently close to the DOM model, that XML-based sources can be processed without cumbersome transformations, such as XML to relational representations. The combination of these features, plus the simplicity of the inventive LDAP-based model to efficiently support XPath queries, make it the ideal candidate for an XML proxy caching system.

Since a query, written in a semi-structured query language can be naturally split into a sequence of subqueries, the problem of cache answerability becomes an easier one. By using context and result attributes, intermediate evaluation results of a query can be cached independently of their superordinate query, allowing for the development of cache answerability algorithms that work at the subquery level. Since the structure of subqueries, as well as their evaluation process is simpler than that of complete queries, more efficient algorithms that check for containment and rewriting possibilities can be implemented.

Another further benefit of working with queries, written in a semi-structured query language, at the subquery level is the possibility to perform partial query evaluations, or to evaluate a query until a specific intermediate result has been achieved. This provides the basis for efficient evaluation algorithms over user queries that rely on previous results or a specific context. It is well known that queries tend to be localized, and that small variations of the same query appear together in time, as a result of users refining, redefining, or extending their queries to match their expectations.

The evaluation procedure in accordance with the invention facilitates the finding of context matches not only at the beginning, or the end of a query, but more importantly, also within the inner subqueries. This is of extreme importance for queries that are performed by means of a compiler or graphical interface that translates higher level language queries into queries, written in a semi structured query language, since the same trends, patterns and contexts are used over and over again.

By finding partial matches among the subqueries that compose a request, one can effect subquery preprocessing following a partial match in the same way a CPU does branch prediction, with the added benefit that, as opposed to a CPU, one can benefit from partial subquery results, even in the case where one "mispredicted", or did not have enough information to process the whole subquery. As the evaluation routine trickles down, its result is combined with the precomputed subquery leading eventually to the correct result. The implementation of this procedure involves an almost trivial change to the query algorithm, where the loop that performs the computation of the context is unrolled and parallelized based on the (partially) known previous result.

The fact that a query evaluation could be potentially performed in parallel due to the detection of partial matches in user requests is a most important benefit of the inventive approach that makes it suitable for a distributed environment. This evaluation can be made in parallel either on the same machine that received the original query, or in other machines that might be less overloaded at the moment. Since each one of the inventive caches keeps a distributed index of the contents of all other caches in the system, it can decide to send a partial evaluation request to another peer that happens to already have an answer to part of the query, thus making the evaluation process much more efficient.

In a preferred embodiment of the method, the semi-structured data comprises XML data. This embodiment has the advantage of applying the invented method to the standard language for semi-structured data used in information exchange on the internet.

In a preferred variation of this embodiment, the query written in a semi-structured query language is an XPath query. This variation has the advantage of using the XPath query language which has been specially adapted for query of XML data.

In a second variation of the preferred embodiment, the XML data comprises WML data. This variation allows the method to be applicable for smaller XML files typical for use with WML data which can be efficiently processed.

In a particularly preferred embodiment of the invention, attributes are used to store information concerning individual semi-structured data nodes and a distinguished name is assigned to each of said data nodes to define a unique location in an LDAP hierarchy at the instance level, with these operations being performed during transformation of the semi-structured data into LDAP data. This embodiment has the advantage of remapping the semi-structured data into a format appropriate for use in the LDAP environment.

In a preferred variation of this latter embodiment, the semi-structured data is transformed to comprise a node, an element and an attribute. This variation has the advantage of further defined mapping of the semi-structured data into a hierarchical structure within the LDAP environment.

In a first refinement of this variation, the node, the element and the attribute each comprise an oc attribute, an oid attribute, and a name. This refinement distributes location information through various levels to permit faster and more efficient queries as well as uniquely defining the location of a node in the document hierarchy.

In a first embellishment of this refinement, the element further comprises an order. This step defines the node location within the global document order to improve query access. In an improvement of this embellishment, the attribute further comprises a first value. This improvement permits capture of textural information at the attribute node level. In a second improvement the element further comprises a second value. This additional improvement permits storage and location of additional textual information in the node.

In an additional preferred embodiment of the invention, the scope of the query is extended to permit queries in an upward as well as in a downward direction. This embodiment expands the LDAP query directional capabilities to permit queries from the root to the leaves and vice versa for consistency with many query languages such as e.g. XPath queries.

In an additional especially preferred embodiment, the semi-structured data query is converted into a plurality of sub-queries. This embodiment subdivides the main query into a set of smaller queries each of which can be executed to extract partial results without having to carry out the full query in its entirety, thereby improving efficiency of the search. In an improvement of this embodiment the plurality of sub-queries are executed in parallel. This improvement permits distribution of the query path among various processors and also allows performing sub-queries with partial results which can be communicated to other sub-query components to speed and direct search.

In a further preferred embodiment of the invention, the scope of the search is restricted to a first node, to a first level of nodes, to all nodes below a base node under action of a filter expression, to a parent node, to sibling nodes or to all ancestors up to a root node. This embodiment makes use of the structure of the LDAP document to limit and define the degree of detail in a response to the query.

In a first preferred variant of embodiments of the invention having sub-queries, at least one cache answerability algorithm is executed at the level of the sub-queries. This embodiment takes advantage of the sub-query structure to generate simplified algorithms which e.g. can be used to check for containment and rewriting possibilities.

In a second variant of this embodiment, the sub-queries are restructured into a main query and secondary queries. This feature allows different processing algorithms for main and sub-queries to generate more rapid and directed results for improved search. In an embellishment of this improvement the sub-queries are restructured once more into a second main query and at least one refined query. This feature permits a focussed search of a sub-set of the original query to which the same processed algorithms can be applied as in the original main query and sub-queries, thereby facilitating nested searches.

In a further improvement of embodiments having sub-queries, a partial query evaluation is effected on at least one of the sub-queries. This feature takes advantage of the fact that most queries tend to be localized with small variations of the same query tending to appear together in time in consequence to users refining, redefining or extending their queries and makes use of this fact to improve speed and directability of the search.

In a further improvement of sub-query evaluation, at least one of the sub-queries is pre-processed. This feature permits evaluation of results following a partial query match. The results can then, in turn, be used to further refine subsequent queries to converge to a correct result.

The invention is also directed to a device for incorporating and accessing semi-structured data within an LDAP environment, the device having means for converting the semi-structured data into LDAP data as well as means for converting a query, written in a semi-structured query language for operation on the semi-structured data, into an LDAP query. Means are also provided for accessing said LDAP data with said LDAP query.

A storage medium written with machine readable instructions for carrying out the method of the invention is also within the purview thereof.

Further important details of the invention are described below with reference to the tables, the figures and preferred detailed embodiments. The various features disclosed in the figures and in the subsequent description can be used collectively or individually in arbitrary combination. Moreover, the embodiments shown are not considered to be exhaustive enumeration of all possible inventive configurations, rather have exemplary character only for illustrating the invention.

BRIEF DESCRIPTION OF THE TABLES AND DRAWING

Figure 2:
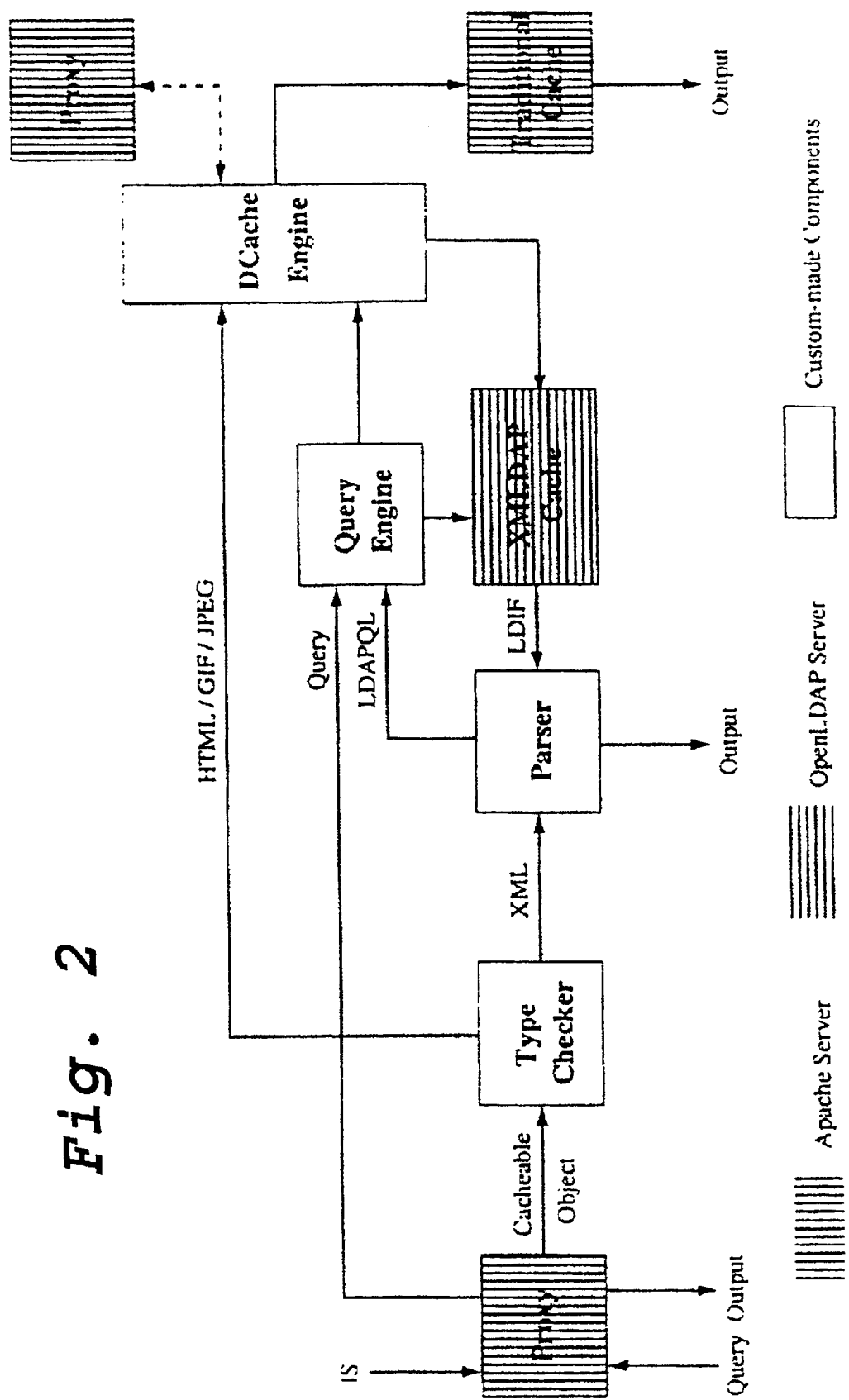
Figure 6:
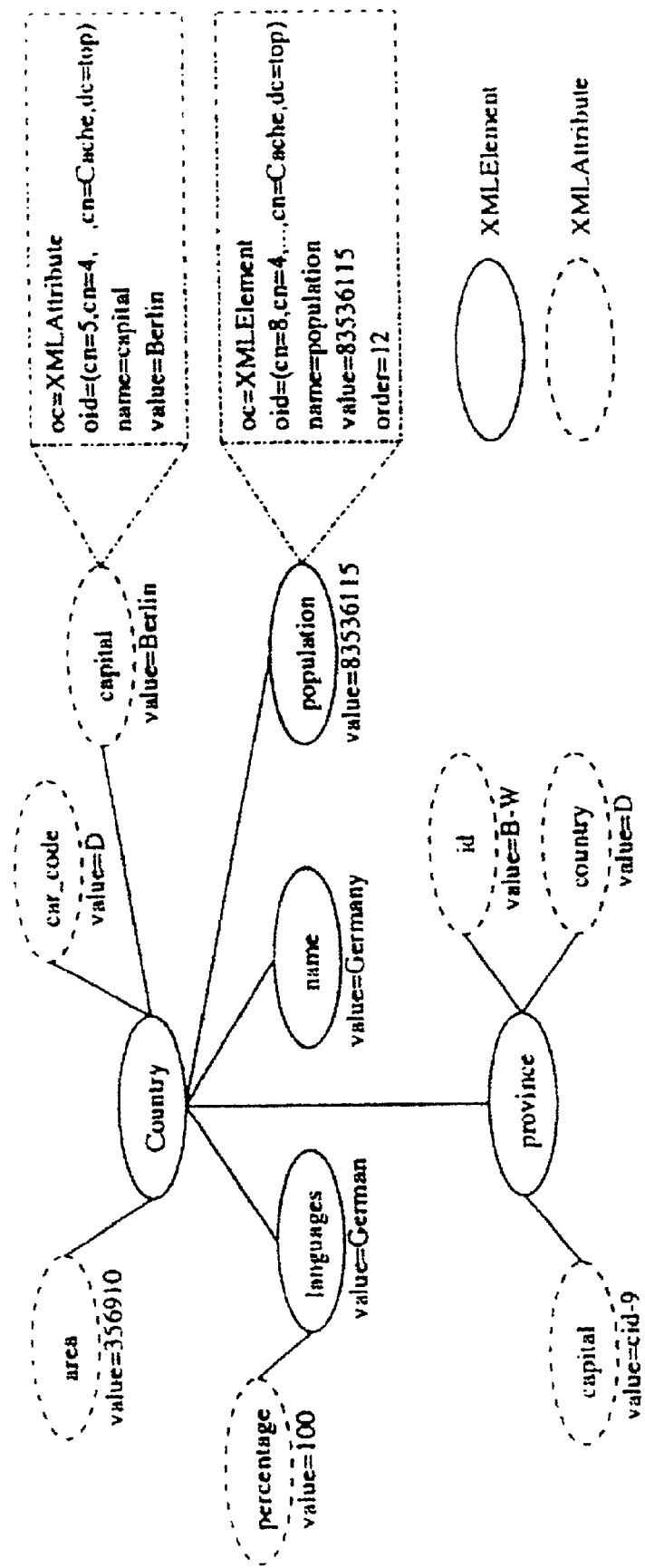
Figure 8:
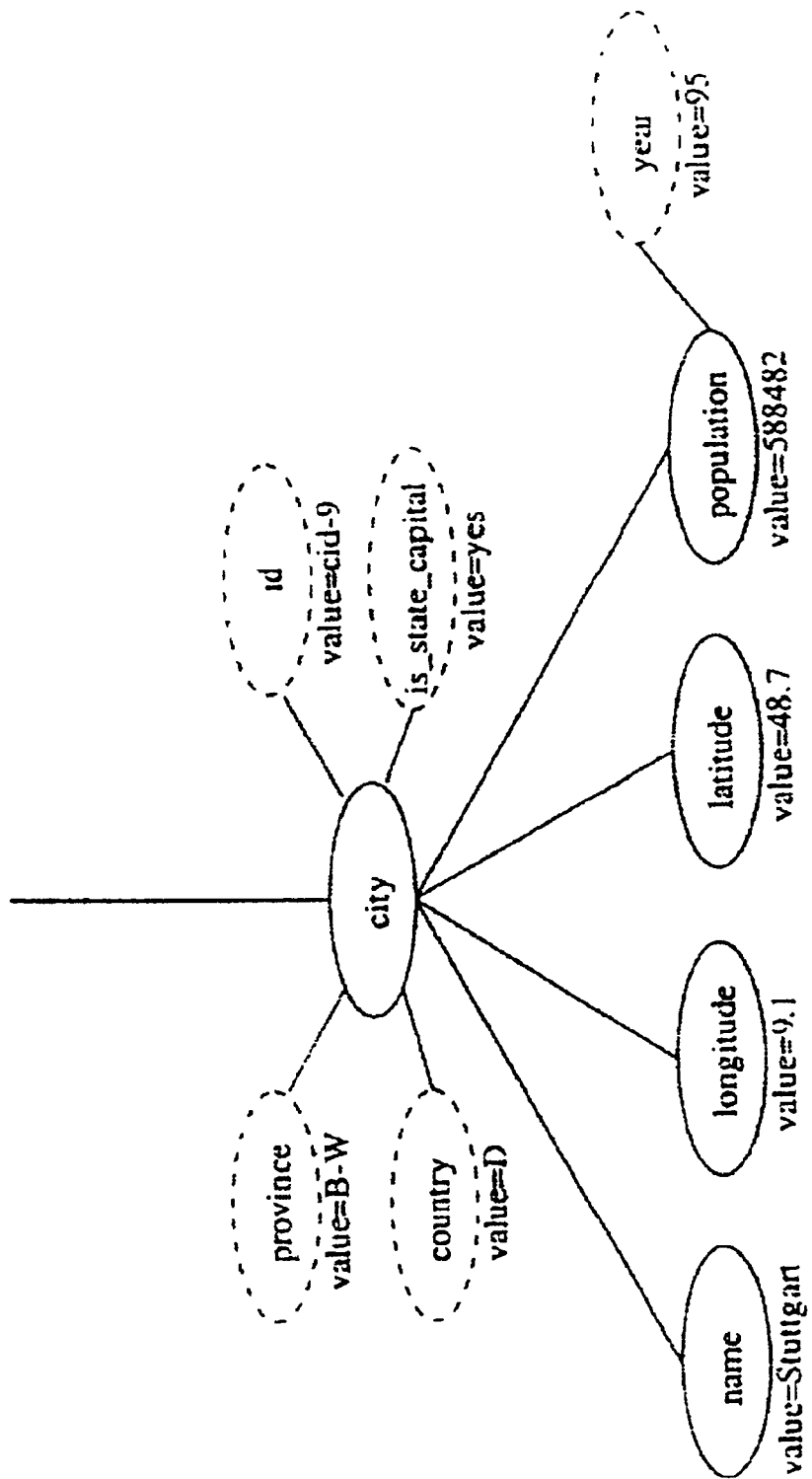
Figure 10:
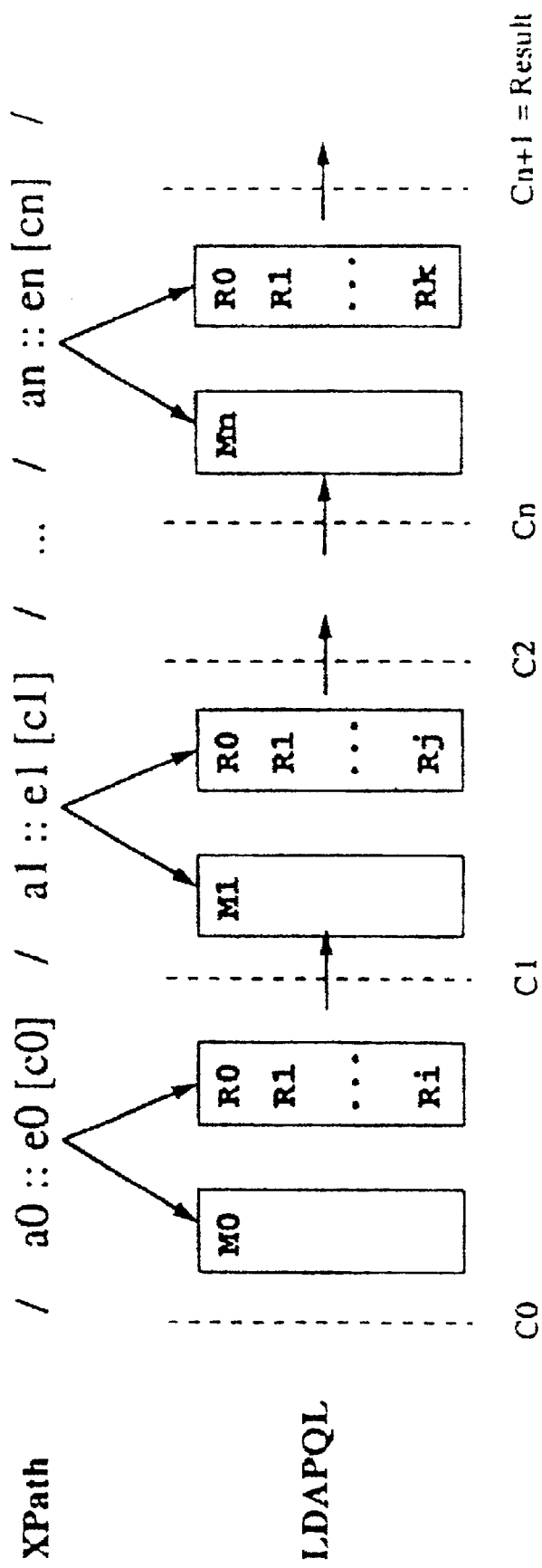

Table 1: Allowed Axis Expressions in XPath;

Table 2: Axis Translation Function;

Table 3: Comparison of Storage Requirements;

Table 4: Average Storage and Retrieval Time;

Table 5: Performance for XPath using DOM and HLCaches;

FIG. 1: General architecture;

FIG. 2: Proxy Cache Server Internal Architecture;

FIG. 3: LDAP Class Hierarchy for XML Data Representation;

FIG. 4: XML-to-LDAP translation algorithm;

FIG. 5: First Excerpt from a Mondial XML file;

FIG. 6: XML Data Integration;

FIG. 7: Second Excerpt from a Mondial XML file;

FIG. 8: XML Document in LDAP;

FIG. 9: LDAP Classes for Query Representation;

FIG. 10: XPath Evaluation;

FIG. 11: XPath-to-LDAPQL translation algorithm; and

FIG. 12: XPath-to-LDAPQL algorithm (EVAL and PET subroutines).

DESCRIPTION OF THE PREFERRED EMBODIMENT

The system in accordance with the invention provides a hierarchical, LDAP-based, distributed caching system that allows the storage and efficient retrieval of static web information, like HTML pages, images, etc., as well as XML documents in a common cache environment. The software has been implemented on top of Plexor, a middleware software that provides support for the distribution of data and required group membership management.

FIG. 1 depicts a group of four browsers (B) retrieving information from three different information systems (IS) through the inventive system, composed, in this particular example, of two levels of proxy caching servers that exchange information both at the inter-level and the intra-level domains.

The configuration of the individual proxy cache nodes in the inventive system, as well as their belonging to a particular level in the hierarchy are managed by the underlying Plexor system, which also provides facilities for scalability, replication, fault-tolerance and the transparent addition or removal of nodes in the system. Internally, each one of the proxy cache nodes in FIG. 1 is made up of the following components, schematically represented in FIG. 2:

Proxy Web Server Cpart of the Apache server)

Query Engine

Distributed Cache Engine

XML Parser

XMLDAP Cache (OpenLDAP Server)

Traditional Cache (also part of the Apache server)

A modified version of the popular Apache Server [Apache Group. Apache web server. www.apache.org/.] is heavily used in the inventive system to provide the functionality of a caching proxy server that forwards user requests as needed, either to the appropriate node in the hierarchy or directly to the information system after the corresponding processing has been done by the node.

As it is obvious from FIG. 2, the proxy engine serves as a front-end that collects queries in the form of URL requests, and transmits the result (output) back to the client. Whether or not the node has the necessary information in either one of its caches to provide the answer without incurring the overhead of contacting other nodes is determined by the Query Engine and the Distributed Cache Engine.

If, as may be the case, the node does not have the necessary information to answer the request by itself, the query is forwarded to the next level in the hierarchy, and the answer cached in the node as it is sent back to the client. Whether the object should be cached in the Traditional Cache or in the XMLDAP Cache is determined by the Type Checker.

In the current modified version of the server, functionality specifically designed for the inventive system can be turned on or off via the standard httpd.conf configuration file. Therefore, the invention can be deployed on existing Apache proxy servers by simply installing the modified executable and adjusting a small number of configuration parameters.

The Query Engine is a custom-made component designed to process, decompose and normalize XPath [James Clark and Steve DeRose. XML path language (XPath) version 1.0. www.w3c.org/tr/xpath, November 1999] queries into LDAP constructs that the XMLDAP Cache can understand. Any other type of queries, like URL requests that do not contain XPath expressions, are forwarded to the Distributed Cache Engine to determine whether or not the system as a whole could process the request. The decomposition and normalization of queries plays an extremely important role in the cache answerabillty problem, and more importantly, in the efficient processing and delegation of queries and subquenes, as will be seen below.

In order to speed up the querying process, the Query Engine works in close cooperation with the Distributed Cache Engine, whose only purpose so far, is the management of a distributed index of the contents of both, the XMLDAP Cache and the Traditional Cache from all nodes in the system. In the future, the Distributed Cache Engine will also be responsible for the efficient integration and processing of Document Type Definitions (DTDs) to allow for the correct characterization and utilization of semantically related cache entries with different syntax.

Due to the nature of the internal representation in the XMLDAP Cache all access to this component is made through the XML Parser, which is responsible for the translation of XML data into LDAPQL, the LDAP Query Language described below.

This translation process is what differentiates the inventive caching mechanism from traditional approaches, where the document is treated as a normal file with no additional characteristics. The invention, on the other hand, generates an LDAP tree that allows the system to extract additional information used by the Query Engine to efficiently direct its efforts to the appropriate place in the document.

As an additional feature, the XML Parser also handles the conversion of an LDAP tree structure to XML, allowing for on-the-fly generation of well-formed XML documents from partial documents cached at a previous time. The XMLDAP Cache is based on the last available version of the OpenLDAP server [OpenLDAP Group. OpenLDAP server. www.openldap.org/.] modified to provide the higher performance requirements typical of a caching system. The purpose of this component is to serve as a specialized cache for XML documents, and therefore, the standard configuration has been changed to fulfill the requirements imposed by the storage of generic XML documents, as will be seen below.

In the inventive system, the XMLDAP Cache runs as a separate process from the Apache server, and can therefore be installed either locally to the Proxy server or in another node, which allows for greater configurability and flexibility. In fact, the job of the Distributed Cache Engine can be greatly simplified if one of the caches in the system is shared among several of its member nodes. The Traditional Cache, on the other hand runs as a module inside the Apache server in order to provide a caching mechanism for other types of documents besides XML. The implementation of the Traditional Cache is based on the mod_proxy module which, since its conception has been included in all Apache distributions to cache HTML documents, GIF files, JPEG files, etc.

The heart of the efficiency and flexibility of the inventive system with respect to XML lies on the structure of its internal data and query representation. Since the inventive system is based on LDAP, the internal storage model is defined in terms of LDAP classes and attributes, as described in M. Wahl, T. Howes, and S. Kille. Lightweight directory access protocol (v3). RFC 2251, December 1997. If the reader is not familiar with the LDAP model and protocol, please see T. A. Howes, M. C. Smith, and G. S. Good. Understanding and Deploying LDAP Directory Services. Macmillan Network Architecture and Development. Macmillan Technical Publishing U.S.A., 1999, for an informal description of its features, or H. V. Jagadish, Laks V. S. Lakshmanan, Tova Milo, Divesh Srivastava, and Dimitra Vista. Querying network directories. In SIGMOD 1999, Proceedings ACM SIGMOD International Conference on Management of Data, Jun. 1–3, 1999, Philadephia, Pa., USA, pages 133–144. ACM Press, 1999, for a formal one.

The inventive structure provides the following characteristics:

Allow for arbitrary XML documents to be stored efficiently,

Avoid unnecessary changes in the LDAP schema that slow down the storage process.

Allow for efficient query processing, partitioning and forwarding.

Provide support for meta-data that describes the current contents of the inventive system.

Based on these requirements, three representation models have been designed that, despite their simplicity, provide an elegant and uniform environment for effective processing of XPath queries in the inventive system. Since XPath is the basis for more complex querying languages like Quilt [Quilt: An XML Query Language for Heterogeneous Data Sources. Don Chamberlin and Jonathan Robie and Daniela Florescu. In Proceedings of the Third International Workshop on the Web and Databases, pages 53–62, Dallas, Tex., May 2000], support for XPath is a necessary requirement for any system that deals with semi-structured data in the form of XML. The following sections go into detail about each one of the internal representations: XML documents, XPath queries, and meta-data.

Anybody familiar with both, the XML specification and the LDAP model can infer the connection between Document Type Definitions (DTDs) in the XML world and the class and attribute schema definition in LDAP. The most obvious way to represent XML documents in LDAP is, therefore, to provide two mappings: one between the DTDs and the schema definition to provide the structure, and another one between the XML document and the LDAP instance level. This intuitive but naive approach has several disadvantages:

The integration of a DTD in LDAP involves changes to the schema that, by definition, is assumed to be static in LDAP [M. Wahl, T. Howes, and S. Kille. Lightweight directory access protocol (v3). RFC 2251, December 1997].

Even in the case where extensions to the basic LDAP model are used so that dynamic changes in the schema are allowed [Y. Yaacovi, M. Wahl, and T. Genovese. Lightweight directory access protocol (v3): Extensions for dynamic directory services. RFC 2589, May 1999.], their update is troublesome and can introduce illegal nodes at the instance level.

The DTD for most XML documents is not available, reducing the number of cacheable XML documents considerably.

Therefore, the inventive internal representation has been developed in such a way as to eliminate these problems without losing the ability to incorporate arbitrary XML documents in the inventive system. FIG. 3 describes the contents of the XMLNode, XMLElement and XMLAttribute classes that constitute the basic elements of the inventive representation.

The generality of the inventive model to encode arbitrary XML documents is based on two key factors:

The use of the attributes defined in FIG. 3 to store information about individual XML nodes.

The hierarchical nature at the instance level of the LDAP model, where each node must be assigned a distinguished name that defines its unique location in the hierarchy.

The meaning of the attributes and classes defined in FIG. 3 is straightforward. The oc attribute denotes whether the node represents an XMLElement or an XMLAttribute, and is a required attribute of every LDAP node. The oid attribute, also part of every LDAP node, contains its distinguished name, and therefore, information about the location of this particular node in the document hierarchy. The name attribute contains the name of the XMLElement or XMLAttribute defined by the node and, although not a required attribute by the LDAP specification, it is a required attribute of the inventive model, since every XML node needs to have a name. The combination of the oid and the name attribute constitute an ad-hoc implementation of the namespace concept defined in the XML standard, allowing for the sharing of names at different levels of the hierarchy without introducing name clashes.

The XMLelement Class differs from the XMLAttribute class in that the former requires the presence of an order attribute, whereas the tatter does not even allow it. This attribute is used to encode the relative ordering of a particular node in the document hierarchy which, as will be seen later, is crucial for the correct implementation of queries like next-node, previous-node, next-sibling, etc., as defined in the XPath standard [James Clark and Steve DeRose. XML path language (XPath) version 1.0. www.w3c.org/tr/xpath, November 1999].

Finally, the value attribute is used to store the contents of either an XMLElement or an XMLAttribute. Since an XMLElement can have an empty body, the existence of the value attribute is not guaranteed, as opposed to an XMLAttribute that, by definition, requires it.

Given this definition, the XML2LDAP algorithm depicted in FIG. 4 is used whenever an XML document D is parsed to be included in the inventive system. Its inverse algorithm (LDAP2XML) is obvious and not presented here.

In order to illustrate the translation process that occurs whenever an XML document is incorporated into the inventive cache, an excerpt of the Mondial database available in XML has been taken as a first example (FIG. 5). The element country has attributes car_code, area and capital and several subelements (name, population, etc), some of which have in turn, attributes and/or textual contents, like Germany or 83536115.

For each element in the XML document, one creates an XMLElement node where the LDAP attributes name, order, value and oid from FIG. 3 are set to their corresponding values. For example, the languages tag in the document would create an XMLElement with name=languages; order=4, 4, since it is the fourth node in global document order; value=German, because the textual content of the node is the string "German" and oid=(cn=4, cn=1), which contains information in the form of an LDAP distinguished name to determine the location of this node in the document hierarchy. The oc attribute, which represents the LDAP class the node belongs to, is initialized to oc=XMLElement.

The attribute percentage from the languages node is processed in a similar way. One creates an XMLAttribute node, where the LDAP attributes are initialized as follows: name=percentage, value=100 and oid=(cn=5, cn=4, cn=1). One observes the XPath convention that attribute nodes are stored as children of their corresponding element, and therefore, the oid LDAP attribute is initialized to represent this fact. Finally, the oc attribute is set to oc=XMLAttribute.

FIG. 6 contains the graphical representation of the LDAP tree generated as a result of applying the transformation algorithm we have just described.

FIG. 7 provides a second, more detailed, example illustrating the use of the LDAP classes in FIG. 3, based on a second excerpt of the Mondial database available in XML format. FIG. 8 contains the graphical representation of the LDAP tree generated as a result of applying the previous algorithm to the contents of FIG. 7. In the inventive system, the convention has been adopted that all XML documents are stored under the (cn=Cache, dc=top) node (as indicated in the figure), but this does not change the generality of the inventive procedure and representation.

In addition to providing a data representation model, caches also need to be able to represent queries in order to determine whether or not a particular query has already been stored and/or is answerable using only the data obtained from previously cached information. Following the same schema as in the previous section, we have extended the standard classes of the inventive LDAP server to include an XMLQuery class that contains all relevant information about a particular query and its result set.

The detailed list of attributes that constitute an XMLQuery is shown in FIG. 9. The meaning of the oc attribute is analogous to that of the data representation classes previous defined. It simply contains the name of the LDAP class a particular node belongs to. In the inventive case, all nodes used to represent either a query or part of it, have a value of XMLQuery in their oc attribute. The hash attribute contains an encoded string that uniquely identifies a query. The purpose of this attribute is to serve as a key that can be used among different parts of the inventive distributed caching system to exchange information about their cache contents without having to actually send more than a couple bytes per cached document.

The next four attributes, context, scope, xpathquery and result define a query or subquery in terms of the characteristics described in the XPath specification [James Clark and Steve DeRose. XML path language (XPath) version 1.0. www.w3c.org/tr/xpath, November 1999]. The context attribute is a set of distinguished names defined as the result Set of a (possibly non-existing) previous subquery. The contents of the result attribute is the set of distinguished names that contain the LDAP nodes resulting from applying the query stored in the xpathquery attribute under the scope defined in the scope attribute on the context of the query. By means of these four attributes, the inventive caching system is able to provide support for subquery rewriting, remote query processing, cache answerabillty, and other features that will be dealt with in detail below.

Finally, the last three attributes keep information used to determine how long this query (and its results) should be kept in the cache. The create_time attribute contains a timestamp with the specific time that this entry was originally created. The access_time is analogous to create_time, but contains the timestamps of the last two accesses to the query. Periodically, the server purges entries that have not been accessed within a predefined interval. Lastly, the popularity attribute keeps a count of the number of times this query has been accessed.

The last piece of internal information kept by each proxy node in the system is meta-data, that is, data about the contents of the cache, as well as a set of currently stored queries and the location of their results. Meta-data of the inventive system is stored in a special LDAP node called (cn=admin, cn=Cache, dc=top) that has the following attributes:

next: Contains a monotonically increasing integer used to assign a unique internal name to every new XML document stored in the cache.

count: Represents the number of XML documents stored at a given time in the system.

node-count: Represents the number of nodes stored in the system.

maturity: Represents the lower access interval limit where an entry is considered to be "aging" in the system.

death: Represents the upper access interval limit used by the purge routine to decide that an entry must be eliminated.

low-watermark: The lower limit of nodes in the system that trigger the purge routine.

high-watermark: The absolute hard limit of nodes in the system that render it unusable until the purge routine deletes the necessary number of nodes to drive the current node_count below this limit.

These attributes, in collaboration with the last set of attributes defined for XMLQuery nodes in the previous section, allow for the management and administration of the cache and its contents, without incurring in any noticeable overhead. It is worth noting that the inventive caches are strictly read-only and that all write operations are forwarded directly to the information systems, allowing us to relax the inventive representation and avoid a whole set of other administration attributes, like a dirty attribute, that unnecessarily complicate the management of the cache. Although this restriction might appear as a serious draw-back from the inventive cache, the high ratio of read vs write operations on the Internet backs the inventive decision up to the point of making it a reasonable design policy. Furthermore, issues of cache consistency among members of the inventive system are easier to solve if the user is only allowed to write directly to the server.

The query model used by the invention is very close to the traditional LDAP query model described in the standard specification [M. Wahl, T. Howes, and S. Kille. Lightweight directory access protocol (v3). RFC 2251, December 1997.] and in other pieces of the literature [T. A. Howes, M. C. Smith, and G. S. Good. Understanding and Deploying LDAP Directory Services. Macmillan Network Architecture and Development. Macmillan Technical Publishing U.S.A., 1999. H. V. Jagadish, Laks V. S. Lakshmanan, Tova Milo, Divesh Srivastava, and Dimitra Vista. Querying network directories. In SIGMOD 1999, Proceedings ACM SIGMOD International Conference on Management of Data, Jun. 1–3, 1999, Philadephia, Pa., USA, pages 133–144. ACM Press, 1999]. However, the inventive model differs from previous approaches in the inventive desire to limit to a minimum the number of changes to the standard LDAP model so that it can be deployed easily in existing systems, while at the same time providing full XPath support [James Clark and Steve DeRose. XML path language (XPath) version 1.0. www.w3c.org/tr/xpath, November 1999]. Other papers [H. V. Jagadish, Laks V. S. Lakshmanan, Tova Milo, Divesh Srivastava, and Dimitra Vista. Querying network directories. In SIGMOD 1999, Proceedings ACM SIGMOD International Conference on Management of Data, Jun. 1–3, 1999, Philadephia, Pa., USA, pages 133–144. ACM Press, 1999] provide extensions to the LDAP model that, although very interesting and valid, either go beyond the requirements of XPath, or need considerably more work than the inventive model in order to be deployed in current systems.

By allowing full XPath expressive power in the inventive system, one can support not only XML (since XPath has become the de facto querying language for XML), but also a whole breadth of semi-structured models whose querying languages are based on variations of the same idea exploited by XPath, e.g. Quilt [Quilt: An XML Query Language for Heterogeneous Data Sources. Don Chamberlin and Jonathan Robie and Daniela Florescu. In Proceedings of the Third International Workshop on the Web and Databases, pages 53–62, Dallas, Tex., May 2000].

In the traditional LDAP query model a query is defined in the following way:

Definition [LDAP Query]. An LDAP query $Q_L=(b_{QL}, s_{QL}, f_{QL}, p_{QL})$ is a 4-tuple filter-based expression where:

$b_{QL}$ is the distinguished name of the base entry in the directory instance where the search starts from.

$s_{QL}$ is the scope of the search, which can be base, if the search is to be restricted to just the first node, onelevel, if only the first level of nodes is to be searched, or subtree, if all nodes under the base should be considered by the filter expression.

$f_{QL}$ is the filter expression defined as the boolean combination (written in prefix notation) of atomic filters of the form (a op t), where a is an attribute name; op is a comparison operator from the set $\{=, =, <, , >, \}$; and t is an attribute value.

$p_{QL}$ is an (optional) projection of LDAP attributes that define the set of attributes to be returned by the query. If $p_L$ is empty, all attributes are returned.

EXAMPLE

The LDAP Query $Q_L$=("cn=Cache,dc=top",subtree, (oc=XMLQuery), {hash}) retrieves the hash attribute from all XMLQuery nodes under the cn=Cache,dc=top node, possibly to report the inventive own cache contents to other nodes in the system.

As specified in [James Clark and Steve DeRose. XML path language (XPath) version 1.0. www.w3c.org/tr/xpth November 1999], the primary purpose of the XPath standard is to address parts of an XML document, usually represented in the form of a tree that contains element, attribute and text nodes. An XPath Query $Q_x$ is formed by the concatenation of path expressions that perform walk-like operations on the document tree retrieving a set of nodes that conform to the requirements of the query. Each expression is joined with the next by means of the classical Unix Path character '/'.

Definition [XPath Query] An XPath Query $Q_X$ is defined as:

$Q_X=q_0/q_1/ \ldots /q_n$, where $q_i$ is an XPath subquery defined below, and '/' the XPath subquery separator.

Definition [Xpath Subquery] An XPath Subquery $q_i$ is a 3-tuple $q_i=(C_i, w_i, C_{i+1})$, where:

$C_i$ is a set of XML nodes that determine the input context.

$w_i$ is the Path Expression to be applied to each node of the input context (defined below).

$C_{i+1}$ is a set of XML nodes resulting from the application of the path expression wi onto the input context Ci. Ci+1 is also called the output context.

Definition [XPath Path Expression] A Path Expression wi is a 3-tuple wi=ai: :ei[ci], such that:

ai is an axis along which the navigation of the path expression takes place (see table 1 for a complete list).

ei is a node expression that tests either the name of the node or its content type.

ci is a boolean expression of conditional predicates that must be fulfilled by all nodes along the path.

The XPath query: $Q_x$=/child::mondial/child::country [attribute::car_code="D"] is composed of two subqueries whose combination selects all country nodes directly connected to the mondial node that have an attribute car_code with value "D".

In the inventive system, the traditional LDAP query model described above has been extended to include the necessary modifications to support XPath queries. The gist of the modifications rely on the fact that LDAP only allows searching of the document tree in one direction, namely, from the root to the leaves, whereas XPath contains axis (see table 1) that perform queries in the "upwards" direction. Therefore, the notion of scope in the traditional model must be extended to also include parents, siblings and ancestors, as defined below.

Definition [LDAPQL Query]. An LDAPQL Query $Q_{HL}$ is a 4-tuple $Q_{HL}=(b_{QHL}, s_{QHL}, f_{QHL}, p_{QHL})$, such that:

$b_{QHL}$ is the distinguished name of the base entry in the directory instance where the search starts from.

$s_{QHL}$ is the scope of the search, which can be:
base if the search is to be restricted to just the first node,
onelevel if only the first level of nodes is to be searched,
subtree if all nodes under the base should be considered by the filter expression,
parent if only the parent node should be considered,
siblings if only the siblings of the node should be considered,
ancestors if all the ancestors of the node up to the root are to be searched.

$f_{QHL}$ is the filter expression defined as the boolean combination of atomic filters of the form (a op t), where a is an attribute name; op is a comparison operator from the set $\{=, =, <, , >, \}$; and t is an attribute value.

$p_{QHL}$ is an (optional) projection of LDAP attributes that define the set of attributes to be returned by the query. If $p_{QHL}$ is empty, all attributes are returned.

Using this new model, one can transform any XPath query into a series of LDAPQL queries that achieve the same goal, as described in detail below.

Given the nature and structure of the XPath model described above, in order to evaluate an XPath query, each input and output context $C_i$ is computed by means of two types of LDAPQL queries: (1) main queries (M) and (2) refinement queries (R). FIG. 10 contains a graphical representation of the XPath2LDAPQL evaluation algorithm (see FIG. 11), where each XPath subquery is translated in one main query and a set of refinement queries, that uniquely determine the input context for the next step of the computation.

In order to evaluate an XPath query $Q_X$ the original statement must first be translated into an LDAPQL query so that the inventive system can compute the result. FIG. 11 contains pseudocode for the XPath2LDAPQL algorithm that performs the translation of the query. The translation algorithm takes care of filling up the necessary information for each of the subqueries in an instance of the XMLQuery class, and uses the EVAL and PET procedures to perform the evaluation and translation of the path expressions found in each subquery. FIG. 12 contains the definition of the two subroutines.

The PET and EVAL subroutines invoke in turn the LDAP subroutine to retrieve the result of a query, and the BaseScope procedure, whose purpose is to provide the right base, scope and initial type filter for an LDAPQL query given a base node and the axis component of a path expression. This function is best described by means of a table (see table 2), where the first two columns represent the input to the function, and the last three its output.

The integration of built-in functions in XPath2LDAPQL involves testing the $a_i$ and $c_i$ expressions in the PET subroutine for reserved names of functions that need to be executed before the BaseScope function is called. Although present in the inventive system, the formalization of built-in functions for their presentation in this paper adds complexity to the discussion without providing any better insight in the inner workings of the inventive algorithm.

To illustrate the evaluation and translation process, application of the inventive algorithm to the XPath query $Q_X$ illustrated above, produces the following results:

$q_0$=/child::mondial/
  $C_0$={dn(root)}, since one starts at the beginning of the document.
  $w_0$=child::mondial[]
  $C_1$={dn(mondial)}
$q_1$=child::country[attribute::car_code="D"]
  $C_1$={dn(mondial)}
  $w_1$=child::country[attribute::car_code="D"]
  $C_2$={dn(Germany)}, since Germany is the only country in FIG. 5 whose car_code attribute has the value "D"

where the result of the PET algorithm for $w_0$ and $w_1$ is:
  $w_0$=child::mondial[]
    $Q_0$=(dn(root),onelevel,(&(oc=XMLElement) (name="mondial")), {})
    $S_0$={}
  $w_1$=child::country[attribute::car_code="D"]
    $Q_1$=(dn(mondial),onelevel, (&(oc=XMLElement) (name="country")),{})
    $S_1$={(dn(country),onelevel, (&(oc=XMLAttribute)(& (name="car_code") (value="D") ) ), {})}

In order to prove the feasibility of the invention as an efficient cache for XML, a series of experiments have been performed to determine the following characteristics of the inventive system: document storage overhead; average storage and retrieval time; and query execution performance improvement. Replacement policies of any kind have not been considered in the inventive system because the aim of the inventive experiments is to prove the feasibility of the invention as a caching mechanism for XML, and, for now, not to devise or propose new replacement policies. Preliminary experiments involve more than one server and make use of the paralielization capabilities of XPath queries in the inventive system.

All experiments in the following sections have been performed on a Pentium III 450 MHz based computer running Red Hat Linux 6.1, a modified version of the Apache Server v.1.3.12 and a heavily modified implementation of the OpenLDAP Server v.1.2.10. Modifications to the Apache server involve the integration of the Type Checker and the XMLDAP Cache, as described in section 2, whereas the changes performed on the OpenLDAP server had to do with the implementation of the internal representation described in section 3, and series of modifications to the query processing and network communication module. These last changes, which also involve the addition of a thread pool per connection to the server, have been responsible for an increase in performance of over two orders of magnitude with respect to the original OpenLDAP implementation when performing a rapid sequence of LDAP operations, which is crucial for the inventive translation and evaluation algorithms.

The data files used in the inventive benchmarking experiments come from several sources: the Mondial database that contains geopolitical information about countries, organizations, geographical entities, etc; XSLBench [Kevin Jones. XSLBench 1.4. www.tfi-technology .com/XML/xslbench.html, October 2000.], a performance benchmark of XSLT [James Clark. XSL transformations (XSLT) version 1.0. www.w3.org/TR/xsit, November 1999.] processors maintained by Kevin Jones; the ACM Sigmod Record Database [ACM. Sigmod record web edition. www.acm.org/sigs/sigmod/record, December 2000.] in XML form; and a database of "Great Books" maintained in WML [www.oasis-open.org/cover/wap-wml.html.] at JollyRoger [Jollyroger.com great books. jollyroger. nbci.com.], which serves as an example of the use or the invention with WAP technology [www.wapforum.org/.], since WML is nothing but a set of XML documents that conform to the WML Document Type Definition.

Table 3 contains data on the storage requirements of the most representative files used in the inventive experiments. The "Apache Cache" column shows the storage requirements (in bytes) of the corresponding document under the "normal" caching technique used in the Apache project, whereas the HLCaches column contains the size of the inventive internal data representation in compressed form, as it is stored on disk. This comparison is a fair one since the invention is designed to replace the traditional caching mechanism used by the proxy module in Apache.

As can be seen in table 3, the overhead of the traditional cache is minimal, since only a header containing information about the caching time, expiration date, size of the file, etc. is stored with the file. Therefore, small files suffer from a greater relative overhead than big files. For the inventive internal representation, the storage requirements are about 2.8 times that of the original size of the file, with no direct correlation between size and relative overhead, as in the previous case. Although the inventive representation has greater overhead than the traditional cache representation, the additional querying capabilities of the inventive system make it a reasonable tradeoff.

Table 4 contains data an the storage and retrieval times of the same files used for the storage requirement experiment. The storage operation involves loading an XML document into HLCaches by means of the XML2LDAP algorithm, after a query has been formulated, whereas the retrieval operation assumes that the document is already in the inventive system and needs to be reconstructed to be returned to the client. For this experiment, the absolute size of the file is not so important as the number of element and attribute nodes in the document. The storage and retrieval times have been measured as seen by the Apache server after performing the corresponding operations, and are always greater than the ones seen by the clients, since they start receiving data from the server before the whole operation is complete, which helps achieve even better times from the client perspective.

As depicted in table 4, the invention can process nearly 4700 store operations per second, which correspond to about 2700 XML nodes/second, with each node being either an element or an attribute. The performance of storage operations is superior to that of retrieval operations because they are performed asynchronously, meaning that the Apache server does not need to wait for the LDAP server to complete the operation before it sends the next one. On the other hand, retrieval operations are synchronous, since the order in which nodes are received as an important factor for the reconstruction of the original document from its individual nodes. Despite the relative performance disadvantage of read operations overall, the fact that clients start receiving the document as soon as the first bytes are generated, and that most documents are not as big as the ones used in the inventive experiments, imply that there is no noticeable overhead for read operations seen from the perspective of the client.

In the third set of experiments, one has tried to determine the relative performance gain of the inventive query mechanism with respect to similar XPath engines by the proper use of LDAP filters and translation mechanisms as detailed in section 4. For the following set of queries, a C-based implementation of an XPath engine [Daniel Veillard. www.XMLsoft.org/.], developed for the Gnome project [GNOME.www.gnome.org/.] by Daniel Veillard, has been taken. At the time when the inventive experiments initiated, this engine was the only open source XPath implementation of which one was aware, written in C that could be compared to the inventive system (also written in C). The original version was modified to use the inventive system as a substitute for the DOM representation needed to perform XPath queries on a XML document.

Table 5 shows some of the most representative XPath queries involving simple walk-throughs and predicate testing, and their processing times in seconds using the DOM backend and the inventive system. The queries were performed on a "clean" cache loaded with the mondial-2.0.XML file used in previous experiments. As can be seen in the table, The invention performs better than the DOM representation in all cases where the query requires more than a mere name lookup. The use of filters to reduce the search space of possible answers as early as possible has a tremendous effect on the performance of the inventive system, not only on simple queries, like the ones in table 5, but more importantly on complex queries that use these patterns as their building blocks. Furthermore, the easiness of integration of the inventive in a distributed environment, like the Internet, enables the evaluation of such queries in parallel, as described in detail above.

In the world of caching technologies for the internet, the two most prominent examples of hierarchical caching systems are Harvest [C. Mic Bowman, Peter B. Danzig, Darren R. Hardy, Udi Manber, Michael F. Schwartz, and Duane P. Wesseis. Harvest; A scalable, customizable discovery and access system. Technical report, University of Colorado at Boulder, March 1994, Anawat Chankhunthod, Peter B. Danzig, Chuck Neerdaeis, Michael F. Schwartz, and Kurt J. Worrell. A hierarchical internet object cache. In Proceedings for USENIX '96, 1996] and Squid [M. Hamilton, A. Rousskov, and D. Wessels. Cache digest specification-version 5. squid.nlanr.net/CacheDigest/cache-digest-v5.txt, December 1998]. Although the inventive system also provides a hierarchical caching structure, it differs from both systems, first, in that it also provides querying facilities, acting more like materialized view layer of a semi-structured database than a traditional cache. Secondly, the inventive system can reconfigure its topology on-the-fly, allowing for optimization techniques and methods not available on Harvest or Squid. Finally, the inventive integration approach for arbitrary semi-structured documents is generic, as opposed to the wrapper technology used by Harvest to implement brokers for indexing specific data formats.

The inventive approach is also similar to some active caching techniques, since it offers additional features and capabilities to non-traditional cacheable types, as opposed to HTML, image files, etc. However, the usual focus of active caching systems [Pei Cao, Jin Zhang, and Kevin Beach. Active cache: Caching dynamic contents on the Web. In Proceedings of the 1998 Middleware conference, September 1998. www.cs.wisc.edu/-cao/papers/active-cache.html], lie on applications and applets either in Java or Javascript, whereas the inventive system focuses on semi-structured data and how to efficiently query it, and not take into account the more programmatic cacheable entitles that populate the World Wide Web.

Finally, the distributed indexing mechanism implemented in the inventive system relate to the notion of active catalogs in Nomenclator [J. J. Ordille and B. P. Miller. Distributed active catalogs and meta-data caching in descriptive name services. In Robert Werner, editor, Proceedings of the 13th International Conference on Distributed Computing Systems, pages 120–129, Pittsburgh, Pa., May 1993. IEEE Computer Society Press], where, interestingly enough, the focus was on X.500 directories [Information processing systems—open systems interconnection—the directory: Overview of concepts, models and service. ISO/IEC JTC 1/SC21, International Standard 9594-1, 1988], the precursor to LDAP. The invention differs from Nomenclator in its widest breadth of features, its caching functionality, and in the fact that the distributed index capabilities of the invention have to support indexing over incomplete semi-structured databases that make the process a more challenging one.

Additional possible improvements to the invention include:

Distributed Indexing: the implementation of distributed indexing capabilities in the invention will improve the guidance and management of the evaluation process of parallelizable queries.

Topology Discovery: additional experiments can determine policies and mechanisms to perform the automatic discovery of optimal topologies in the inventive system.

Subquery Analysis: Further experiments performed with "typical" batches of XPath queries can determine to what degree subquery processing, pre-evaluation and storage should be encouraged.

Optimization Policies: Systematically addressing each link in the processing chain in the inventive system can lead to the discovery of new optimization mechanisms and policies, either at the XPath level, or at the internal representation level.

Replacement Policies: Policies to determine what to delete from the cache, or to send to other peers for off-site storage become important as soon as the deployment of the invention starts to take place into systems with limited caching space. Since these policies should make use of the distributed indexing capabilities of the inventive system, traditional LRU techniques, might not be optimal if semantic information and the contents of other nodes are taken into account.

Herein, the design, internal data representation details and query model of the invention, a hierarchical distributed caching system based on LDAP technology and developed for the efficient storage and retrieval of semi-structured data on the Internet has been presented. Evaluation algorithms have been presented that allow the inventive system to provide full support for XPath queries, as well as a storage model for XPath based on subquery processing that enables the seamless integration of distributed and parallel query execution on the invention. Experimental data has also been provided that characterizes the storage requirements and average access times of the inventive system in comparison to more traditional caching schemes. Although the inventive approach incurs in some additional overhead, mainly in terms of storage space, the advantages it provides outweigh this factor, especially when dealing with applications that use small XML files as their information basis, as it is the case with wireless applications and the WML standard. The invention initiates a distributed caching system that is able to efficiently cache and provide additional querying capabilities for semi-structured data while, at the same time, allow the integration of more traditional data representations, like HTML, graphics, etc. in a common, distributed system.

TABLE 1

| Axis Name | Considered Nodes |
|---|---|
| ancestor | Any node along the path to the root |
| ancestor-or-self | Same, but including the current node |
| attribute | Consider only attribute nodes in the tree |
| child | Any node directly connected to the current node |
| descendant | Any node from the subtree rooted at the current node |
| descendant-or-self | Same, but including the current node |
| following | Any node with id greater than the current node |
| following-sibling | Any same-level node with id greater than the current node |
| parent | The direct predecessor of the current node |
| preceding | Any node with id lower than the current node |
| preceding-sibling | Any same-level node with id lower than the current node |
| self | The current node |

TABLE 2

| n | $a_i$ | $b_{QHL}$ | $s_{QHL}$ | $t_f$ |
|---|---|---|---|---|
| n | ancestor | n | ancestors | oc = XMLElement |
| n | ancestor-or-self | n | {ancestors, base} | oc = XMLElement |
| n | attribute | n | onelevel | oc = XMLAttribute |
| n | child | n | onelevel | oc = XMLElement |
| n | descendant | n | subtree | oc = XMLElement |
| n | descendant-or-self | n | {subtree, base} | oc = XMLElement |

TABLE 2-continued

| n | $a_i$ | $b_{QHL}$ | $s_{QHL}$ | $t_f$ |
|---|---|---|---|---|
| n | following | root(n) | subtree | (&(oc = XMLElement) (order > order(n))) |
| n | following-sibling | parent(n) | onelevel | (&(oc = XMLElement) (order > order (n))) |
| n | parent | n | parent | oc = XMLElement |
| n | preceding | root(n) | subtree | (&(oc = XMLElement) (order < order (n))) |
| n | preceding-sibling | parent(n) | onelevel | (&(oc = XMLElement) (order < order (n))) |
| n | self | n | base | oc = XMLElement |

TABLE 3

| File Name | Size | Apache Cache | Overhead | HLCaches | Overhead |
|---|---|---|---|---|---|
| mondial-2.0. XML | 1037629 | 1038094 | 1.00 | 3372502 | 3.25 |
| europe-2.0. XML | 317913 | 318384 | 1.00 | 1017080 | 3.20 |
| dream. XML | 149524 | 149982 | 1.00 | 303613 | 2.03 |
| SigmodRecord. XML | 494591 | 495056 | 1.00 | 1401088 | 2.83 |
| books1.wml | 3129 | 3586 | 1.15 | 8039 | 2.57 |
| Average | — | — | 1.03 | — | 2.78 |

TABLE 4

| File Name | Nodes/Ops | Stor. (s) | Ops/sec. | Retr. (s) | Ops/sec. |
|---|---|---|---|---|---|
| mondial-2.0.XML | 39633/57116 | 13.34 | 2970.99/ 4281.56 | 85.86 | 461.60/ 665.22 |
| europe-2.0.XML | 12783/18186 | 3.88 | 3294.59/ 4687.11 | 26.84 | 476.26/ 677.57 |
| dream.XML | 3361/6231 | 1.19 | 2824.37/ 5236.13 | 10.22 | 328.86/ 609.69 |
| SigmodRecord.XML | 15263/38518 | 8.43 | 1810.55/ 4569.16 | 56.33 | 270.95/ 683.79 |
| booksl.wml | 96/138 | 0.0098 | 9795.92/ 14081.63 | 0.18 | 533.33/ 766.66 |
| Average | — | — | 2725.12/ 4693.50 | — | 384.27/ 659.07 |

TABLE 5

| Query Patterns | Nr. Result Nodes | DOM back-end | HLCaches |
|---|---|---|---|
| /mondial/country | 260 | 0.69 | 0.05 |
| /mondial//city | 3047 | 217.67 | 11.23 |
| /mondial/country [@car_code = 'D'] | 1 | 6.36 | 2.31 |

TABLE 5-continued

| Query Patterns | Nr. Result Nodes | DOM back-end | HLCaches |
|---|---|---|---|
| /mondial// city[@ is_cap = 'yes'] | 230 | 276.56 | 17.05 |

We claim:

1. A method for incorporating and accessing semi-structured data within an LDAP environment, the method comprising the steps of:
   a) transforming the semi-structured data into LDAP data by using attributes to store information about individual semi-structured nodes, and by assigning a distinguished name to each of said data nodes to define a unique location in an LDAP hierarchy at an instance level;
   b) converting a query, written in a semi-structured query language for operation on semi-structured data, into a LDAP query; and
   c) accessing said LDAP date with said LDAP query.

2. The method of claim 1, wherein said semi-structured data comprises XML data.

3. The method of claim 2, wherein said query written in a semi-structured query language is an XPath query.

4. The method of claim 2, wherein said XML data comprises WML data.

5. The method of claim 1, wherein said semi-structured data is transformed to comprise a node, an element and an attribute.

6. The method of claim 5, wherein said node, said element and said attribute each comprise a first attributes, a second attribute, and a name.

7. The method of claim 6, wherein said element further comprises an order.

8. The method of claim 7, wherein said attribute further comprises a first value.

9. The method of claim 8, wherein said element further comprises a second value.

10. The method of claim 1, wherein step b) comprises the step of extending a scope to permit queries in an upward and downward direction.

11. The method of claim 1, wherein step b) comprises the step of converting said semi-structured data query into a plurality of sub-queries.

12. The method of claim 11, wherein said plurality of sub-queries are executed in parallel.

13. The method of claim 10, wherein said scope is one or restricted to a first node, restricted to a first level of nodes, restricted to all nodes below a base node under action of a filter expression, restricted to a parent node, restricted to sibling nodes, and restricted to all ancestors up to a root node.

14. The method of claim 11, further comprising executing at least one cache answerability algorithm at a level of said sub-queries.

15. The method of claim 11, wherein said sub-queries comprise a main query and secondary queries.

16. The method of claim 11, further comprising restructuring said sub-queries into a second main query and at least one refinement query.

17. The method of claim 11, further comprising partial query evaluation of at least one of said sub-queries.

18. The method of claim 11, further comprising pre-processing of at least one of said sub-queries.

19. A device for incorporating and accessing semi-structured data within an LDAP environment, comprising:
   means for transforming semi-structured data into LDAP data using attributes to store information about individual semi-structured nodes, and by assigning a distinguished name to each of said data nodes to define a unique location in an LDAP hierarchy at an instance level;
   means for converting a query, written in a semi-structured query language for operation on said semi-structured date, into an LDAP query; and
   means for accessing said LDAP data with said LDAP query.

20. A storage medium written With machine readable instructions for carrying out the method steps of claim 1.

* * * * *